United States Patent
Komaba (10) Patent No.: US 10,576,383 B2
(45) Date of Patent: Mar. 3, 2020

(54) PROGRAM, INFORMATION PROCESSING DEVICE, AND CONTROL METHOD

(71) Applicant: GREE, Inc., Tokyo (JP)

(72) Inventor: Yuya Komaba, Tokyo (JP)

(73) Assignee: GREE, Inc., Tokyo (JP)

(*) Notice: Subject to any disclaimer, the term of this patent is extended or adjusted under 35 U.S.C. 154(b) by 0 days.

(21) Appl. No.: 16/023,447

(22) Filed: Jun. 29, 2018

(65) Prior Publication Data
US 2019/0001226 A1    Jan. 3, 2019

(30) Foreign Application Priority Data
Jun. 30, 2017 (JP) .................. 2017-128738

(51) Int. Cl.
| A63F 13/822 | (2014.01) |
|---|---|
| A63F 13/847 | (2014.01) |
| A63F 13/48 | (2014.01) |
| A63F 13/47 | (2014.01) |
| A63F 13/67 | (2014.01) |

(52) U.S. Cl.
CPC .......... *A63F 13/822* (2014.09); *A63F 13/47* (2014.09); *A63F 13/48* (2014.09); *A63F 13/847* (2014.09); *A63F 13/67* (2014.09); *A63F 2300/632* (2013.01); *A63F 2300/636* (2013.01); *A63F 2300/807* (2013.01)

(58) Field of Classification Search
CPC ........ A63F 13/822; A63F 13/47; A63F 13/48; A63F 13/847; A63F 13/67; A63F 2300/632; A63F 2300/636
See application file for complete search history.

(56) References Cited

U.S. PATENT DOCUMENTS

| 2014/0274359 A1* | 9/2014 | Helava ............... A63F 13/00 463/29 |
| 2015/0231499 A1* | 8/2015 | Mizukami .......... A63F 13/5378 463/31 |

FOREIGN PATENT DOCUMENTS

JP     5477929 B1    4/2014

OTHER PUBLICATIONS

Japanese Office Action dated Jul. 10, 2018 of corresponding application No. 2017-128738; 13 pgs.
Hearts of Iron III [Full Japanese Version], Dengeki Games vol. 5, Ascii Media Works, Jan. 22, 2010, vol. 10, pp. 212-221; 12 pgs including partial English-language translation.
(Continued)

*Primary Examiner* — David Duffy
*Assistant Examiner* — Ankit B Doshi
(74) *Attorney, Agent, or Firm* — Maier & Maier, PLLC (57) ABSTRACT

An information processing device running a game program offering an improved level of strategy in a game in which a plurality of game content divided into two or more groups participate. The program may include starting a game part game content featuring the two or more groups, and a plurality of areas in a virtual space. When no area exists that does not belong to a first group on a route from an area belonging to the first group to a specific area belonging to the first group, a first parameter of a first game medium, which may be located on the area and may belong to the first group, may be changed. If another area belonging to the first group and having a second state different from a first state exists on the route, the first parameter of the first game medium may change less or not at all.

10 Claims, 6 Drawing Sheets

(56) References Cited

OTHER PUBLICATIONS

Hearts of Iron II, Province Administration,—Strategy Tutorial for Beginners—, Jun. 10, 2016, [online], retrieved on Jun. 26, 2018, URL: https://web.archive.org/web/20160610135719/http://kamurai.sakura.ne.jp:80/simulation/hoi2/province.htm, 14 pgs. including machine English-language translation.

Provisions for Partisans, Lazy Hol3 Memorandum, Aug. 9, 2014, [online], retrieved on Jun. 26, 2018, URL: http://hoihoisan.cocolognifty.com/blog/2014/08/post-4d90.html, 9 pgs including machine English-language translation.

Episode 48, German Soviet War Not Happened, Virtual Chronicle of Hearts of Iron, Dec. 11, 2009, [online], retrieved on Jun. 26, 2018, URL: http://gen2.cocolognifty.com/blog/2009/12/48-2f70.html, 16 pgs including machine English-language translation.

Office Action dated Dec. 11, 2018 in corresponding Japanese Application No. 2017-128738, 9 pages including English-language translation.

"Fundamentals of Tactical Simulation", URL https://web.archive.org/web/2016715032419/http://kamurai.sakura.ne.jp/simulation/kiso.htm, published Jul. 15, 2016 [online], searched Nov. 22, 2018, 8 pages including English-language translation.

\* cited by examiner

FIG.2

| AREA ID | BELONGING GROUP | SOUNDNESS | TYPE | STATE | STATIONARY GAME MEDIUM ID | POSITIONAL RELATIONSHIP |
|---|---|---|---|---|---|---|
| *** | *** | *** | *** | *** | *** | *** |

FIG.3

| GAME MEDIUM ID | BELONGING GROUP | FIRST PARAMETER | SOUNDNESS |
|---|---|---|---|
| *** | *** | *** | *** |

PROGRAM, INFORMATION PROCESSING DEVICE, AND CONTROL METHOD

FIELD

The present invention relates to a program, an information processing device, and a control method.

BACKGROUND

In the related art, games have been known in which a plurality of game content (for example, characters) divided into two or more groups participate. For example, Patent Literature 1 discloses a game where groups do battle against each other.

[Patent Literature 1], cited above, is Japanese Patent No. 5477929.

SUMMARY

It may be desired to improve the level of strategy in a game in which a plurality of characters divided into two or more groups participate.

An object of the disclosure made in view of such circumstances is to provide a program, an information processing device, and a control method for improving the level of strategy that may be involved in a game in which a plurality of game content divided into two or more groups participate.

According to an exemplary embodiment, there may be provided a program which may cause an information processing device executing a game to execute: starting a game part in which a plurality of game content divided into two or more groups participate; and in a case where there is not an area not belonging to a first group on a route from an area belonging to the first group to a specific area belonging to the first group among a plurality of areas existing in a virtual space, performing a changing process of changing a first parameter of a first game medium which may be located on the area and belongs to the first group, in which, in the changing process, in a case where another area belonging to the first group and having a second state different from a first state exists on the route, a changing amount of the first parameter of the first game medium may be reduced or set to zero.

According to another exemplary embodiment, there may be provided an information processing device executing a game, including a control unit which executes: starting a game part in which a plurality of game content divided into two or more groups participate; and in a case where there is not an area not belonging to a first group on a route from an area belonging to the first group to a specific area belonging to the first group among a plurality of areas existing in a virtual space, performing a changing process of changing a first parameter of a first game medium which may be located on the area and belongs to the first group, in which, in the changing process, in a case where another area belonging to the first group and having a second state different from a first state exists on the route, a changing amount of the first parameter of the first game medium may be reduced or set to zero.

According to still another exemplary embodiment, there may be provided a method of controlling an information processing device executing a game, including: starting a game part in which a plurality of game content divided into two or more groups participate; and in a case where there is not an area not belonging to a first group on a route from an area belonging to the first group to a specific area belonging to the first group among a plurality of areas existing in a virtual space, performing a changing process of changing a first parameter of a first game medium which may be located on the area and belongs to the first group, in which, in the changing process, in a case where another area belonging to the first group and having a second state different from a first state exists on the route, a changing amount of the first parameter of the first game medium may be reduced or set to zero.

According to the disclosure, a program, an information processing device, and a control method may provide improvement of a level of strategy of a game in which a plurality of game content divided into two or more groups participate.

DETAILED DESCRIPTION

Hereinafter, various exemplary embodiments of a program, control method, and apparatus may be described.

Figure 1:
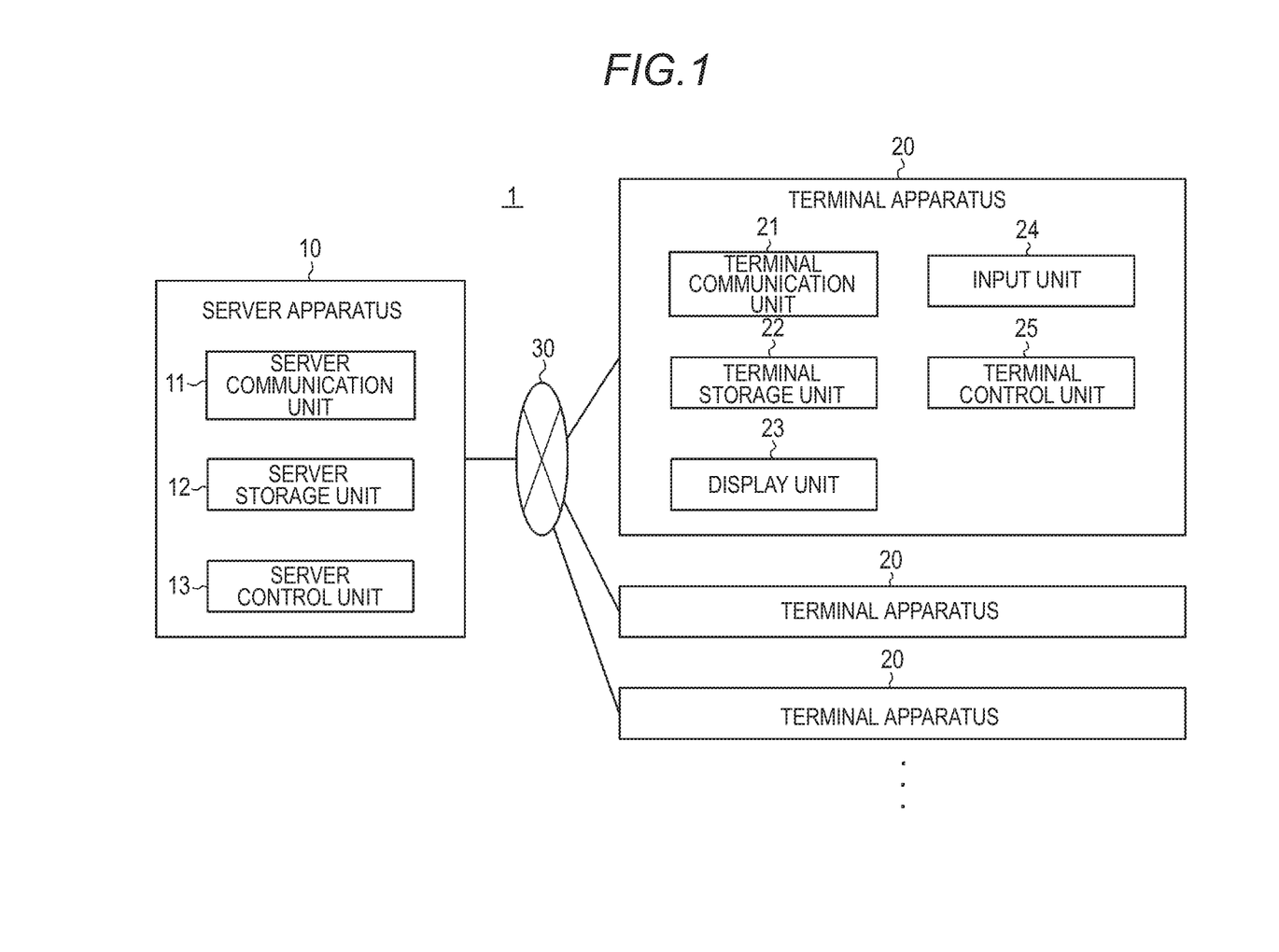
FIG. 1 is a block diagram of a game system according to an exemplary embodiment of the invention.

An exemplary embodiment of a configuration of a game system may first be discussed. An overview of a game system according to an embodiment of the invention may be described with reference to FIG. 1. The game system 1 may include a server apparatus 10 and one or more terminal apparatuses 20. Although FIG. 1 illustrates three terminal apparatuses 20 for convenience, the number of terminal apparatuses 20 may be arbitrarily defined.

The server apparatus 10 may be, for example, an information processing device such as a server managed by a game administrator. The terminal apparatus 20 may be an information processing device used by a user such as a mobile phone, a smartphone, a tablet terminal, a personal computer (PC), a game device, or the like. The terminal apparatus 20 may be capable of executing an application of a game according to this embodiment. The application of the game may be received by the terminal apparatus 20 from a predetermined application distribution server via a network 30 such as the Internet or may be stored in a storage device provided in the terminal apparatus 20 or in a storage medium such as a memory card readable by the terminal apparatus 20 in advance. The server apparatus 10 and the terminal apparatus 20 may be communicably connected via the network 30.

The server apparatus 10 and the terminal apparatus 20 may cooperatively execute various processes related to the game. For example, the server apparatus 10 and the terminal apparatus 20 may share and execute a series of processes. In addition, for example, the server apparatus 10 and the terminal apparatus 20 may execute the same process. With respect to the same process, in a case where the process results match between the server apparatus 10 and the terminal apparatus 20, the server apparatus 10 and the terminal apparatus 20 may complete the process. On the other hand, in a case where the process results do not match between the server apparatus 10 and the terminal apparatus 20, the server apparatus 10 and the terminal apparatus 20 may complete the process by defining the process result of the server apparatus 10 as a positive or may rewind the process to the before-execution of the same process. According to such a configuration, for example, even in a case where the communication quality between the server apparatus 10 and the terminal apparatus 20 may be temporarily deteriorated, the probability that process will be immediately interrupted may be decreased. In addition, in the terminal apparatus 20, even in a case where an illegal process such as rewriting of a parameter or the like is performed, the probability that the illegal process can be eliminated may be improved.

Looking next at an exemplary embodiment of the game, an overview of the game according to this embodiment may be described. The game according to this embodiment may include one or more game parts. At least one of the one or more game parts may be executed by using the game medium. During the execution of the game part, the game medium may be operated, for example, by a user or an artificial intelligence (AI). The AI may be realized by a processor provided in, for example, the server apparatus 10 or the terminal apparatus 20. Hereinafter, the user or AI who operates the game medium may also be referred to as a player.

The game medium may be electronic data used for a game and may include, for example, an arbitrary medium such as a card, an item, a virtual currency, a ticket, a character, and an avatar. In addition, the game medium may be electronic data that can be retrieved, possessed, used, managed, exchanged, synthesized, strengthened, sold, discarded, donated, or the like by the user in the game, but usage of the game medium is not limited to what is stated in this specification.

Hereinafter, unless otherwise stated, the "game medium possessed by the user" denotes a game medium associated with the user ID capable of uniquely identifying the user as the possessed game medium. In addition, "assigning a game medium to a user" denotes that the game medium may be associated with the user ID as a possessed game medium. In addition, "discarding a game medium possessed by a user" denotes canceling the association between the user ID and the possessed game medium. In addition, the "consuming a game medium possessed by a user" denotes that some effect or influence may be generated in the game in accordance with the cancellation of the association between the user ID and the possessed game medium. In addition, "selling a game medium possessed by a user" denotes canceling the association between the user ID and the possessed game medium and associating another game medium (for example, a virtual currency, an item, or the like) with the user ID as the possessed game medium. In addition, "transferring a game medium possessed by a user A to a user B" denotes canceling the association between the user ID of the user A and the possessed game medium and associating the game medium as a possessed game medium with the user ID of the user B. In addition, "creating a game medium" denotes defining or determining at least a portion of information on the game medium.

The game part may be content that the user can play in the game and may include, for example, quests, missions, mini games, acquisition, training, strengthening, and synthesis of game content, searching of virtual spaces, and doing battle against a battle counterparty (for example, another user, an enemy character, a building of an enemy, or the like), and the like. For each game part, one or more predetermined game tasks may be set. In a case where it is determined that one or more game tasks set for the game part to be played by the user have been successfully achieved, for example, a game medium or the like may be given as a reward to the user. Game tasks may include, for example, a task of winning a battle against an enemy character, a task of reaching a goal point in a virtual space, a task that a user character has not been in a predetermined state (for example, a state in which the later-described soundness may be zero) by the time when a predetermined time elapses, and an arbitrary task according to a content of the game part. In addition, achievement of a specific game task (complete task) among one or more game tasks set in the game part may also be referred to as completing the game part. In a case where the user who plays the game part succeeds in achieving the complete task, it may be determined that the game part may be completed, and the game part may be ended.

One or more game parts may include a game part for a single player mode and a game part for a multiplayer mode. The game part for the single player mode may include, for example, a game part (for example, a game part for single person) executed on the basis of a user operation on one terminal apparatus 20 used by one user. For example, one terminal apparatus 20 alone may execute a game part for the single player mode, or one terminal apparatus 20 cooperating with the server apparatus 10 may execute a game part for the single player mode. On the other hand, the game part for a multiplayer mode may include, for example, a game part common to the two or more users (for example, a game part common to a plurality of persons) executed on the basis of user operations on the two or more terminal apparatuses 20 used by two or more users. The game part common to two or more users may include, for example, a game part where at least a portion of progressing process of the game part and at least portion of the process result may be commonly applied to the two or more users. For example, two or more terminal apparatuses 20 cooperate or two or more terminal apparatuses 20 and server apparatus 10 cooperate to execute a game part for a multiplayer mode. One game part may correspond to both the single player mode and a multiplayer mode.

The game according to this embodiment may include a game part in which a plurality of game content corresponding to a plurality of players divided into two or more groups participate. As an overview, in the game part, a plurality of areas may be provided in the virtual space. Each of the plurality of areas may be connected to at least one another area. Each of the plurality of game content may be arranged in one of the areas.

A game medium operated by a player can execute various actions according to the game medium. For example, a game medium which is a character may perform actions such as movement between connected areas, invasion of an area, attack against another game medium, and the like. The player may aim to retrieve an area by operating the game medium. For example, the player can retrieve the area by operating the game medium and invading the area. When the area may be retrieved by the player, the area belongs to the same group as the game medium operated by the player. A player may invade a game medium to an area belonging to another group. In such a case, the ownership of the invaded area may change from the other group to the same group as the game medium operated by the player. Then, when a predetermined game ending condition is satisfied, it may be determined that the group having the largest arbitrary index calculated on the basis of the belonging areas is a winner, and the game part may be ended. The index may include, for example, the number of areas belonging to the group, a total value of scores calculated for the areas belonging to the group, and the like.

The configuration of the server apparatus 10 may be specifically described. The server apparatus 10 may include a server communication unit 11, a server storage unit 12, and a server control unit 13.

The server communication unit 11 may include an interface that communicates with an external device by wireless or wired communication and transmits and receives information. The server communication unit 11 may include, for example, a wireless local area network (LAN) communication module, a wired LAN communication module, or the like. The server communication unit 11 may be capable of transmitting and receiving information to and from the terminal apparatus 20 via the network 30.

The server storage unit 12 may include, for example, a semiconductor memory, a magnetic memory, an optical memory, or the like. The server storage unit 12 may function as, for example, a primary storage device or a secondary storage device. The server storage unit 12 may store information and programs used for processing a game. At least a portion of the information and the programs stored in the server storage unit 12 may be shared and synchronized with the terminal apparatus 20. Hereinafter, an example of the information stored in the server storage unit 12 may be specifically described.

Figure 2:
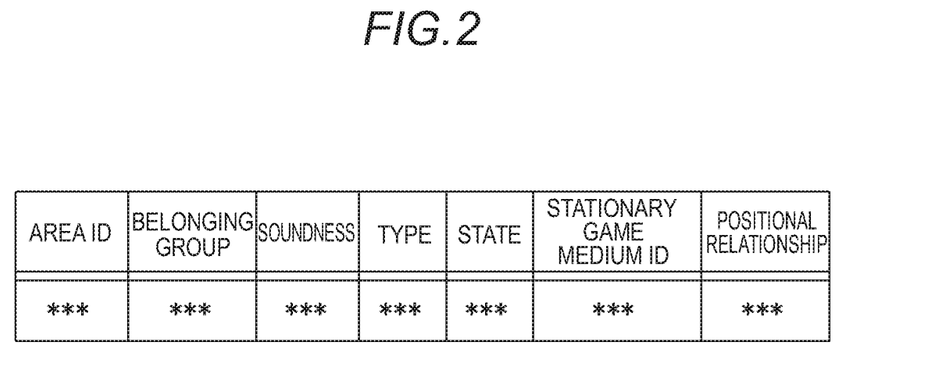
FIG. 2 is an exemplary embodiment of a diagram illustrating information on an area.

To provide further detail on information storage, the server storage unit 12 may store information on a plurality of areas existing in a virtual space. FIG. 2 illustrates an exemplary embodiment of information that may be associated with one area. The information on the area may include "area ID", "belonging group", "soundness", "type", "state", "stationary game medium ID", and "positional relationship".

The "area ID" may be information that can uniquely identify the area.

The "belonging group" may be information indicating a group to which the area belongs.

The "soundness" may be a parameter indicating a degree of deterioration of the area. The soundness of the area may be reduced, for example, in a case where the area may be invaded by a game medium. When the soundness is decreased to a predetermined value (for example, zero), the area may belong to the same group as the game medium that has invaded the area. When the belonging group of the area changes, the soundness may be defined to be a predetermined value.

The "type" may be information indicating a type of the area. In this embodiment, a plurality of arbitrary types may exist. According to the type, a function or role played by the area in a game part may be different. Hereinafter, the plurality of types of the area may be distinguishably described by adding ordinal numbers. For example, there may be an area of the first type and an area of the second type. A plurality of types may be associated with one area. For example, there may be an area of the second type and the third type, and the like. At the start time of the game part, there may be one area of the first type for each group. Hereinafter, the area of the first type may also be referred to as a specific area. The area of the second type may also be called a normal area.

The "state" may be information indicating the state of the area. In this embodiment, a plurality of arbitrary states may exist. The state of the area may change according to the progress of the game part. Hereinafter, each of plurality of states of the area may be distinguishably described by being designated by an ordinal number. For example, the area having the first state, the area having the second state, and the like may exist. Hereinafter, the first state may also be referred to as a normal state. The second state may also be called a flame-up state.

The "stationary game medium ID" may be the game medium ID of the game medium located in the area.

The "positional relationship" may be information indicating the positional relationship between the area and a predetermined another area. The predetermined another area may include, for example, a specific area. For example, the positional relationship may include a distance between the area and the specific area. The distance may be indicated in arbitrary units. For example, in a case where two areas in the virtual space may be connected by one connection line, the distance may be indicated in an arbitrary unit indicating the number of connection lines existing on the route from the area to the specific area, a length of the connection line, or a distance in the virtual space.

The content of the information on the area is not limited to the above example. The information on the area may include arbitrary information unique to the area. For example, the information on the area may include the altitude of the area in the virtual space.

Figure 3:
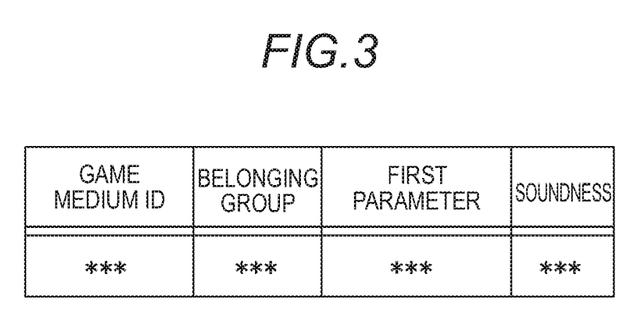
FIG. 3 is an exemplary embodiment of a diagram illustrating information on a game medium.

Looking next at how information may be stored on the game medium, the server storage unit 12 may store information on a plurality of game content used for a game part. Each game medium may include, for example, a game medium possessed by a user. FIG. 3 illustrates information on one exemplary embodiment of a game medium. The information on the game medium may include "game medium ID", "belonging group", "first parameter", and "soundness"

The "game medium ID" may be information capable of uniquely identifying a game medium.

The "belonging group" may be information indicating a group to which the game medium may belong.

The "first parameter" may be a parameter consumed for the game medium to execute a predetermined action in the game part. The predetermined action may include, for example, movement between areas, invasion of an area, an attack against other game content, and the like. For example, when the game medium executes the action on the basis of the instruction of the player, in a case where the first parameter of the game medium does not reach a predetermined value corresponding to the action, the execution of the action may be stopped. The stopping of the execution of the action may ensure that the action is not executed.

The "soundness" may be a parameter indicating a degree of deterioration of the game medium. The soundness of the game medium can be reduced, for example, in a case where the game medium is attacked by another game medium belonging to another group. When the soundness is decreased to a predetermined value (for example, zero), an arbitrary process which becomes disadvantageous in the game may be executed on the game medium. The process may include, for example, a process of temporarily prohibiting execution of an action by the game medium, a process of temporarily deleting the game medium from a virtual space, a process of decreasing a score of a group to which the game medium may belong, and the like.

The server control unit 13 illustrated in FIG. 1 may include one or more processors. The processor may include a general purpose processor and a dedicated processor dedicated to a specific process. The server control unit 13 controls the entire operations of the server apparatus 10. Hereinafter, an example of the operations of the server control unit 13 may be specifically described.

The server control unit 13 may store various kinds of information and programs used for processing the game in the server storage unit 12. The information used for processing the game may include the information on the area and information on the game medium described above.

The server control unit 13 may transmit and may receive information through the server communication unit 11. For example, the server control unit 13 may transmit at least a portion of the information stored in the server storage unit 12 to the terminal apparatus 20. In this manner, the information stored in the server storage unit 12 and the information stored in the terminal apparatus 20 may be shared and synchronized. The timing of sharing and synchronizing the information may include, for example, the timing when new information may be stored in the server storage unit 12 and the timing when the information stored in the server storage unit 12 may be updated. However, the timing may be arbitrarily defined. In addition, for example, the server control unit 13 may retrieve arbitrary information input or determined in the terminal apparatus through the server communication unit 11. The information may include, for example, information input by a player.

The server control unit 13 may cooperate with the terminal apparatus 20 to execute the game. For example, the server control unit 13 may cooperate with one or more terminal apparatuses 20 to execute the game part. Details of the operations of the server apparatus 10 and the terminal apparatus 20 that execute the game part may be described later.

The configuration of the terminal apparatus 20 may be specifically described. As illustrated in FIG. 1, the terminal apparatus 20 may include a terminal communication unit 21, a terminal storage unit 22, a display unit 23, an input unit 24, and a terminal control unit 25.

The terminal communication unit 21 may include an interface that communicates with an external device by wireless or wired communication and may transmit and may receive information. The terminal communication unit 21 may include a wireless communication module compliant with a mobile communication protocol such as Long Term Evolution (LTE) (registered trademark), a wireless LAN communication module, a wired LAN communication module, or the like. The terminal communication unit 21 can transmit and receive information to and from the server apparatus 10 via the network 30.

The terminal storage unit 22 may include, for example, a semiconductor memory, a magnetic memory, an optical memory, or the like. The terminal storage unit 22 may function as, for example, a primary storage device or a secondary storage device. The terminal storage unit 22 may be incorporated in the terminal apparatus 20 or may be connected to the terminal apparatus 20 via an arbitrary interface. The terminal storage unit 22 may store information and programs used for processing the game. For example, the terminal storage unit 22 may store an application program of the game retrieved from a predetermined application distribution server. Hereinafter, the application program may also be simply referred to as an application. The terminal storage unit 22 may store a portion or all of the information on the area and the information on the game medium retrieved from the server apparatus 10.

The display unit 23 may include a display device such as a liquid crystal display or an organic EL display. The display unit 23 can display various screens.

The input unit 24 may include an arbitrary input interface that may receive a user operation. The input interface may include, for example, a pointing device such as a mouse, a physical key, a touch panel integrally provided with the display unit 23, and the like.

The terminal control unit 25 may include one or more processors. The terminal control unit 25 may control the entire operations of the terminal apparatus 20. Hereinafter, an example of the operations of the terminal control unit 25 may be specifically described.

The terminal control unit 25 may transmit and may receive information through the terminal communication unit 21. For example, the terminal control unit 25 may retrieve information and a program to be used for processing of the game. More specifically, the terminal control unit 25 may retrieve an application of the game from a predetermined application distribution server. The terminal control unit 25 may retrieve a portion or all of the information on the area and the information on the game medium from the server apparatus 10.

The terminal control unit 25 may activate the application of the game according to the user operation. The terminal control unit 25 may cooperate with the server apparatus 10 to execute the game. For example, the terminal control unit 25 may allow the display unit 23 to display a screen used for the game. On the screen, for example, a graphic user interface (GUI) for detecting a user operation may be displayed. The terminal control unit 25 can detect the user operation on the screen through the input unit 24.

The processing that may be involved with executing the game part, and specifically the operations of the server apparatus 10 and the terminal apparatus 20 that cooperatively execute the game part, may be described. Herein, a configuration may be described where the server apparatus 10 and the terminal apparatus 20 execute the same process and the server apparatus 10 compares the process result of the server apparatus 10 and the process result of the terminal apparatus 20. For simplifying the description, the operation of the terminal apparatus 20 may be described, and the operation of the server apparatus 10 that may execute the same process as that of the terminal apparatus 20 may be omitted in description.

The terminal control unit 25 starts a game part in which a plurality of game content divided into two or more groups participate. Hereinafter, an example may be described where there are two groups (groups A and B) corresponding to respective two players (players A and B). Each player can operate each game medium belonging to the corresponding group. For example, the player A may be a user who operates the terminal apparatus 20. The player B may be a user who operates an AI or another terminal apparatus 20.

The terminal control unit 25 may allow the display unit 23 to display a screen for executing the game part. At least a portion of the plurality of areas provided in the virtual space may be displayed on the screen.

The terminal control unit 25 may provide action opportunities to each of the plurality of game content. An arbitrary algorithm can be adopted for the process giving the action opportunities. For example, the terminal control unit 25 may give an action opportunity to the game medium each time a predetermined in-game time elapses. The terminal control unit 25 may display predetermined parameters that increase in accordance with the elapse of the in-game time on the screen and may give an action opportunity to the game medium when the parameter reaches a predetermined value. The in-game time may be indicated in arbitrary units. For example, the in-game time may be indicated by system time (for example, second), a number of frames in the frame rate, a number of turns, or the like. The in-game time may elapse during the execution of the game part, except for, for example, a period of execution of a predetermined game presentation, a period of waiting for reception of user operation, and the like.

For example, in a case where a game part proceeds in a turn system, the terminal control unit 25 may give an action opportunity to the game medium each time the turn of a game medium or a group to which the game medium may belong starts. In addition, for example, in a case where a game part proceeds in a real time system, the terminal control unit 25 may give an action opportunity to the game medium each time a predetermined in-game time or a predetermined number of frames elapse.

When the action opportunity is given to the game medium, the terminal control unit 25 may perform the action processing of the game medium on the basis of the instruction of the player operating the game medium. For example, the terminal control unit 25 may allow the game medium to execute actions such as movement between areas, attack against another game medium, invasion of an area, or the like, on the basis of the instructions of the player. The terminal control unit 25 may allow the game medium to execute the action by causing the first parameter of the game medium to be consumed by only a predetermined value corresponding to the action.

When a predetermined event occurs, the terminal control unit 25 may perform the first transition process of allowing the state of the area to transition from the first state to the second state with a first probability.

For example, the predetermined event may include an event related to the area belonging to the group A and the game medium belonging to another group B different from the group A. For example, the event may include an event that a game medium belonging to the group B may execute an invasion of the area belonging to the group A. However, the predetermined event may be not limited to the above example and may be arbitrarily determined. For example, the predetermined event may include an event (for example, an event where a fire occurs) occurring automatically at an arbitrary timing, an event occurring in conjunction with occurrence of another event (for example, a drought event), and the like.

The first probability may be determined on the basis of at least one of information on the area belonging to the group A and information on another area having a predetermined positional relationship with the area and belonging to the group A. For example, the first probability may be lower as the number of game content located on the area (or the other area having a predetermined positional relationship with the area) and belonging to the group A may be larger. The positional relationship may include, for example, a positional relationship of being adjacent to or directly connected to the area. According to such a configuration, it may be possible to give the player a motivation to distribute and arrange a plurality of game content within an area belonging to the group. For this reason, a strategy for distributing a plurality of game content may be formed, suppressing one potential reason as to why the strategy of the game might become simplified. In addition, the possibility of stalemate on a battlefield may be suppressed, and smooth progress of the game may be facilitated. Therefore, the level of strategy of a game in which a plurality of game content divided into two or more groups participate may be improved.

When the state of the area is transitioned from the first state to the second state, the terminal control unit 25 may perform a second transition process of transitioning the state of the other area directly connected to the area and belonging to the same group as the area from the first state to the second state with a second probability. The second probability may be determined on the basis of information on the other area. For example, the second probability may be lower as the number of game content belonging to the same group as the other area and located in the other area becomes larger. The second probability may be determined on the basis of a second parameter of the area described later. For example, the second probability may be higher as the second parameter of the area becomes larger. For example, when the state of the area is transitioned from the first state to the second state by the second transition process, the next second transition process may be executed in a chain manner. The second probability may be determined on the basis of the number of times that the second transition processes may be executed in a chain manner. For example, the second probability may be lower as the number of times that the second transition process are executed in a chain manner becomes larger. The second probability may be determined on the basis of a time interval from the execution of the first transition process to the execution of the second transition process. For example, the second probability may be lower as the time interval from the execution of the first transition process to the execution of the second transition process becomes longer. The second probability may be determined on the basis of the distance from the area transitioned from the first state to the second state by the above-described first transition process to the other area. For example, the second probability may be lower as the distance from the area transitioned from the first state to the second state by the first transition process to the other area becomes longer. According to such a configuration, it may be possible to further give the player a motivation to distribute and arrange a plurality of game content within an area belonging to the group. Therefore, the strategy of a game in which a plurality of game content divided into two or more groups participate may be further improved.

Herein, in a case where there are a plurality of other areas directly connected to the area that has been transitioned from the first state to the second state and which may belong to the same group as the area, the terminal control unit 25 may determine, among the plurality of other areas, one or more other areas which may potentially undergo a transition in their state (which may have the second probability) in the above-described second transition process on the basis of the information on the area. For example, in a case where the state of the area is a state associated with one orientation in the virtual space (for example, a state where wind in the eastward direction may be blowing, or the like), the terminal control unit 25 may preferentially select other areas located in the azimuth orientation as viewed from the area. The terminal control unit 25 may allow the state of the selected another area to be transitioned with the second probability in the second transition process. Alternatively, the terminal control unit 25 may determine, among the plurality of other areas, one or more other areas for transitioning the state with the second probability in the above-described second transition process on the basis of the information on the area and the information on the plurality of other areas. For example, the terminal control unit 25 may preferentially select another area which may have an altitude lower than the area that has transitioned from the first state to the second state. The terminal control unit 25 may change the number of areas to be selected from among the plurality of other areas on the basis of the second parameter of the area that has transitioned from the first state to the second state. For example, the larger the second parameter of the area is, the larger the number of areas to be selected from among the plurality of other areas may be.

When the state of the area is transitioned from the first state to the second state, the terminal control unit 25 may set the second parameter in the area. The second parameter may be used, for example, for changing process to be described later. The terminal control unit 25 may decrease the second parameter to a lower limit value (for example, zero) according to an amount of in-game time that has elapsed. For example, when a predetermined in-game time has elapsed after the transition of the state of the area to the second state, the second parameter of the area may become the lower limit value. The terminal control unit 25 may increase the second parameter of the area in a case where the state of the other area having the predetermined positional relationship with the area having the second state is transitioned from the first state to the second state. The terminal control unit 25 may decrease the second parameter of the area in a case where the state of the other area having the predetermined positional relationship with the area having the second state is transitioned from the second state to the first state. The positional relationship may include, for example, a positional relationship of being adjacent to or directly connected to the area.

The terminal control unit 25 may transition the state of the area from the second state to the first state when a predetermined condition is satisfied. The conditions may include, for example, a condition that a predetermined in-game time has elapsed after transition of the state of the area to the second state, a condition that a predetermined game medium (for example, an item) is used, a condition that a predetermined action has been executed by a game medium, and the like. The predetermined condition may be changed on the basis of the second parameter of the area. For example, as the second parameter of the area becomes larger, the predetermined in-game time may be longer or the usage amount of the predetermined game medium may be increased.

The terminal control unit 25 may perform the changing process of changing (for example, increasing) the first parameter of the game medium. The changing process may be performed at an arbitrary timing. For example, the terminal control unit 25 may perform the changing process when an action opportunity is given to the game medium. More specifically, the terminal control unit 25 may perform the changing process substantially simultaneously with the process of giving the action opportunity to the game medium. More specifically, when an action opportunity is given to the game medium, the terminal control unit 25 may specify a route from the area where the game medium is located to a specific area belonging to the same group as the game medium.

Subsequently, the terminal control unit 25 may determine whether or not another area not belonging to the group exists on the route.

In a case where it is determined that another area not belonging to the group exists on the route, the terminal control unit 25 may end the changing process.

On the other hand, in a case where it is determined that no other area not belonging to the group exists on the route, the terminal control unit 25 may determine a reference amount for changing the first parameter of the game medium. The reference amount may be a predetermined value or may be calculated by an arbitrary algorithm.

Subsequently, the terminal control unit 25 may determine whether or not another area belonging to the group and having the second state exists on the route. In a case where it is determined that another area belonging to the group and having the second state exists on the route, the terminal control unit 25 reduces the reference amount or sets the reference amount to zero. More specifically, the terminal control unit 25 may reduce the absolute value of the reference amount or sets the absolute value of the reference amount to zero. The terminal control unit 25 may reduce the reference amount or set the reference amount to zero on the basis of the second parameter of this area on the route. For example, the larger the second parameter, the smaller the absolute value of the reference amount may be.

Subsequently, the terminal control unit 25 changes the first parameter of the game medium by the reference amount determined as described above. Then, the terminal control unit 25 may end the changing process.

Figure 4:
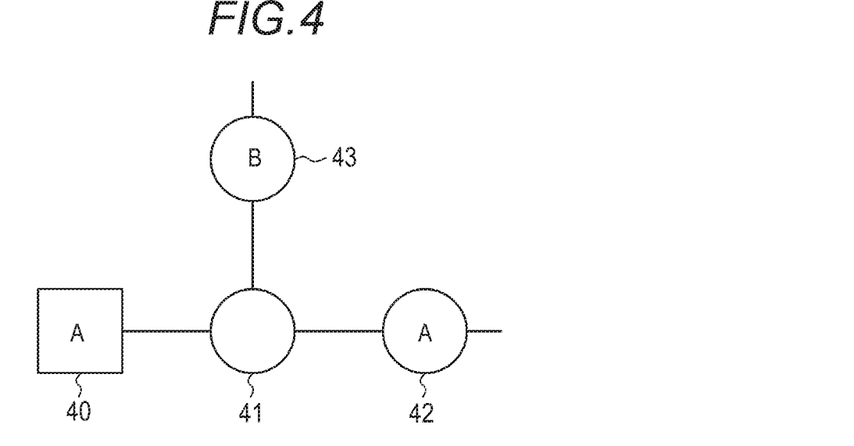
FIG. 4 is an exemplary embodiment of a diagram illustrating a first state of four areas.

A specific example of the above-described changing process may be described with reference to FIGS. 4 to 6. FIG. 4 illustrates four exemplary embodiments of areas 40, 41, 42, and 43 displayed on the screen of the terminal apparatus 20. However, a large number of areas not displayed on the screen may exist in the virtual space.

In FIG. 4, the area 40 may be a specific area belonging to the group A and directly connected to the area 41. The area 41 may be a normal area not belonging to any group. The area 42 may be a normal area belonging to the group A and directly connected to the area 41. The area 43 may be a normal area belonging to the group B and may be directly connected to the area 41. The state of each of the areas 40, 41, 42, and 43 may be the first state. A game medium A belonging to the group A may be located in the area 42.

For example, when an action opportunity may be given to the game medium A, the terminal control unit 25 may perform the changing process of changing the first parameter of the game medium A. More specifically, the terminal control unit 25 may specify a route from the area 42 to the area 40. The areas 40, 41, and 42 exist on the route. The terminal control unit 25 may determine that another area 41 not belonging to the group A exists on the route. For this reason, the terminal control unit 25 may end the changing process.

Figure 5:
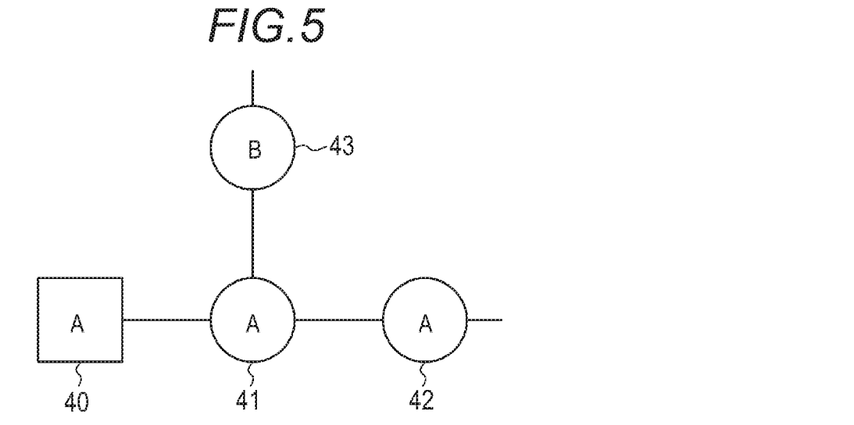
FIG. 5 is an exemplary embodiment of a diagram illustrating a second state of the four areas.

After that, the game part progresses, and for example, as illustrated in FIG. 5, it may be assumed that the ownership of the area 41 has transferred to group A. In such a state, when an action opportunity is given to the game medium A, the terminal control unit 25 may perform the changing process of changing the first parameter of the game medium A. More specifically, the terminal control unit 25 may specify a route from the area 42 to the area 40. The areas 40, 41, and 42 exist on the route. The terminal control unit 25 may determine that another area not belonging to the group A does not exist on the route. Therefore, the terminal control unit 25 may determine a reference amount for changing the first parameter. The terminal control unit 25 may determine that another area belonging to the group A and having the second state does not exist on the route. For this reason, the terminal control unit 25 may change the first parameter of the game medium A by the reference amount. Then, the terminal control unit 25 may end the changing process.

Figure 6:
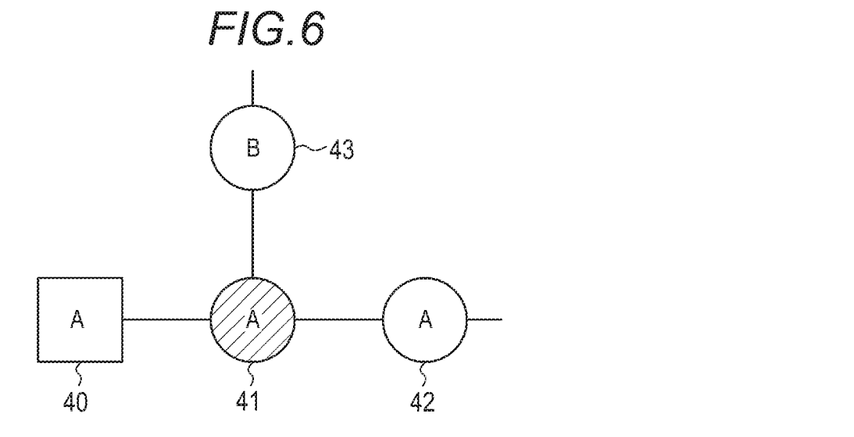
FIG. 6 is an exemplary embodiment of a diagram illustrating a third state of the four areas.

After that, the game part progresses, and for example, as illustrated in FIG. 6, it may be assumed that the area 41 belonging to the group A has the second state. In such a state, when an action opportunity may be given to the game medium A, the terminal control unit 25 may perform the changing process of changing the first parameter of the game medium A. More specifically, the terminal control unit 25 may specify a route from the area 42 to the area 40. The areas 40, 41, and 42 exist on the route. The terminal control unit 25 may determine that another area not belonging to the group A does not exist on the route. For this reason, the terminal control unit 25 may determine a reference amount for changing the first parameter. The terminal control unit 25 may determine that another area 41 belonging to the group A and having the second state exists on the route. For this reason, the terminal control unit 25 may reduce the determined reference amount or sets the determined reference amount to zero on the basis of, for example, the second parameter of the area 41. The terminal control unit 25 may change the first parameter of the game medium A by the reference amount. Then, the terminal control unit 25 may end the changing process.

An example of the operation of an exemplary embodiment of a terminal apparatus may next be provided. A first operation example of the terminal apparatus 20 may be described with reference to FIG. 7. The first operation example may include the operation of the terminal apparatus 20 that performs the process of changing the first parameter described above.

Figure 7:
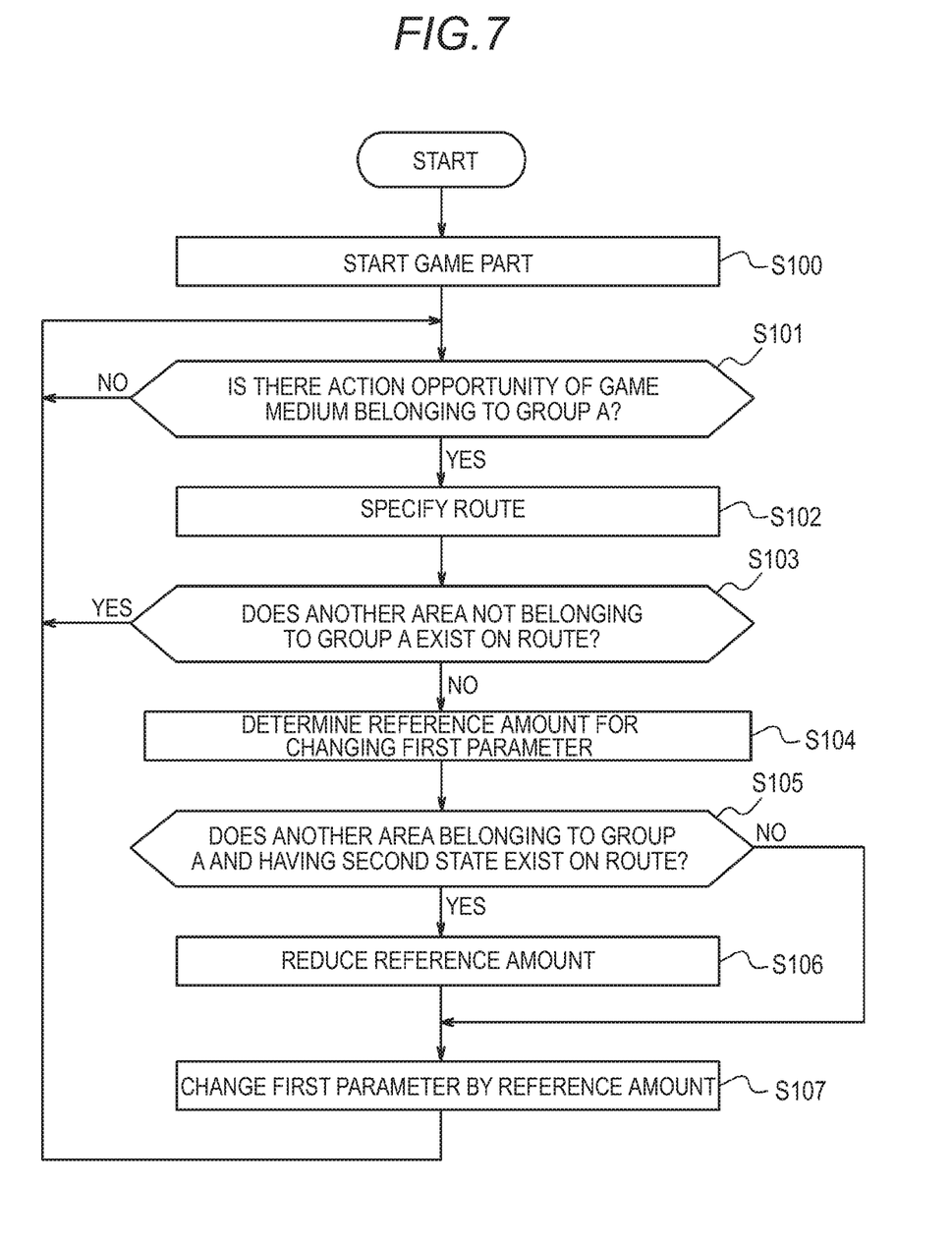
FIG. 7 is a flowchart illustrating an exemplary embodiment of a first operation of a terminal apparatus.

In step S100, the terminal control unit 25 starts a game part in which a plurality of game content divided into two or more groups participate. Herein, an example where there are two groups A and B may be described.

In step S101, the terminal control unit 25 may determine whether or not an action opportunity has been given to the game medium belonging to a certain group (for example, a group A). In a case where it is determined that an action opportunity has been given to the game medium (Yes in step S101), the process proceeds to step S102. On the other hand, in a case where it may be determined that no action opportunity has been given to the game medium (No in step S101), the process repeats step S101.

In step S102, the terminal control unit 25 may specify a route from the area where the game medium is located to the specific area belonging to the same group A as the game medium.

In step S103, the terminal control unit 25 may determine whether or not another area not belonging to the group A exists on the route specified in the step S102. In a case where it is determined that another area not belonging to the group A exists on the route (Yes in step S103), the process may return to step S101. On the other hand, in a case where it is determined that another area not belonging to the group A does not exist on the route (No in step S103), the process may proceed to step S104.

In step S104, the terminal control unit 25 may determine a reference amount for changing the first parameter of the game medium.

In step S105, the terminal control unit 25 may determine whether or not another area belonging to the group A and having the second state exists on the route specified in the step S102. In a case where it is determined that another area belonging to the group A and having the second state exists on the route (Yes in step S105), the process may proceed to step S106. On the other hand, in a case where it is determined that another area belonging to the group A and having the second state does not exist on the route (No in step S105), the process may proceed to step S107.

In step S106, the terminal control unit 25 may allow the reference amount determined in step S104 to be reduced or set to zero, for example, on the basis of the second parameter of the other area determined to exist in step S105.

In step S107, the terminal control unit 25 may change the first parameter of the game medium by the reference amount. In a case where the reference amount may be zero, step S107 may be omitted. Then, the process returns to step S101.

Figure 8:
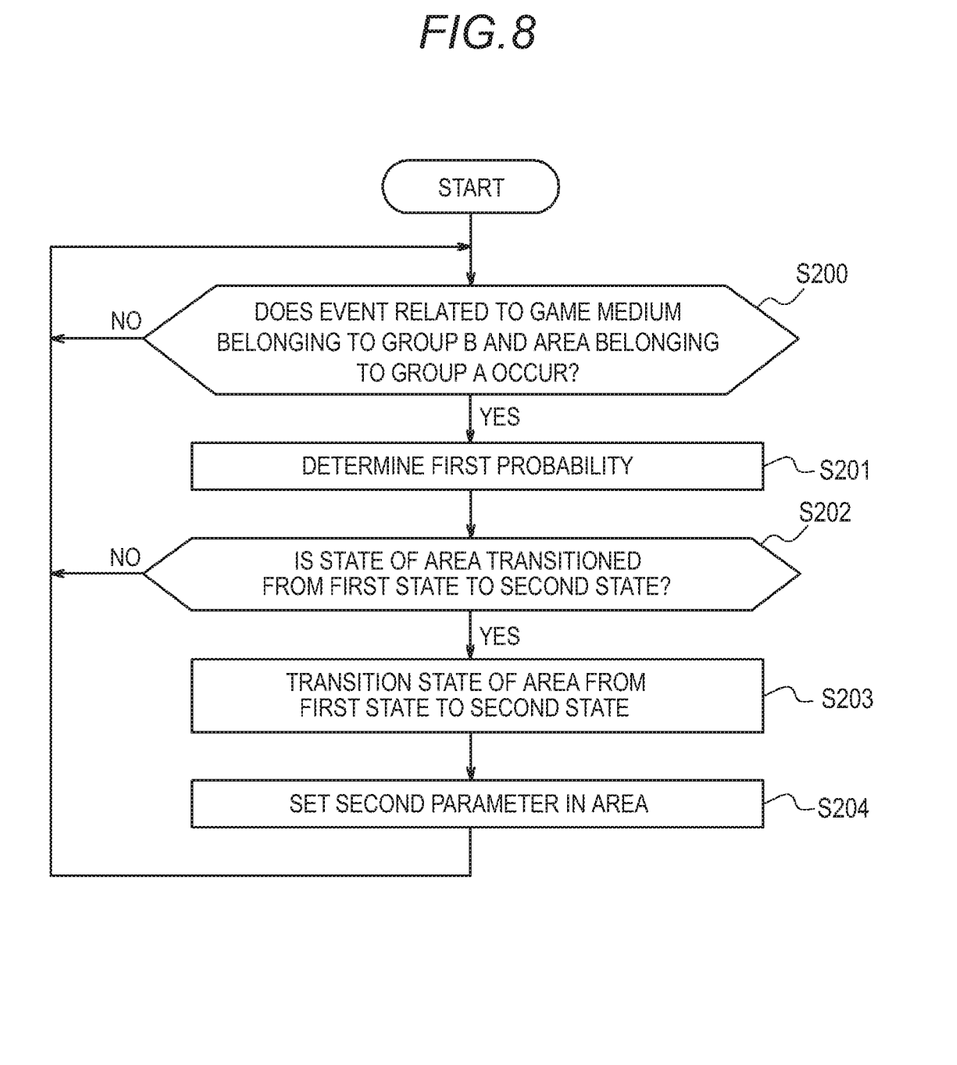
FIG. 8 is a flowchart illustrating an exemplary embodiment of a second operation of the terminal apparatus.

A second operation example of the terminal apparatus 20 may be described with reference to FIG. 8. The second operation example may include the operation of the terminal apparatus 20 that performs the first transition process described above.

In step S200, the terminal control unit 25 determines whether or not an event related to an area belonging to a certain group (for example, a group A) and a game medium belonging to another group (for example, a group B) has occurred. In a case where it is determined that the event has occurred (Yes in step S200), the process may proceed to step S201. On the other hand, in a case where it is determined that the event has not occurred (No in step S200), the process may repeat step S200.

In step S201, the terminal control unit 25 may determine the first probability on the basis of, for example, information on the area.

In step S202, on the basis of the first probability determined in step S201, the terminal control unit 25 may determine whether or not to transition the state of the area from the first state to the second state. In a case where the terminal control unit 25 determines that the state of the area should be transitioned from the first state to the second state (Yes in step S202), the process may proceed to step S203. On the other hand, if it is determined not to transition the state of the area from the first state to the second state (No in step S202), the process returns to step S200.

In step S203, the terminal control unit 25 may transition the state of the area from the first state to the second state.

In step S204, the terminal control unit 25 may set the second parameter in the area. Then, the process returns to step S200.

Figure 9:
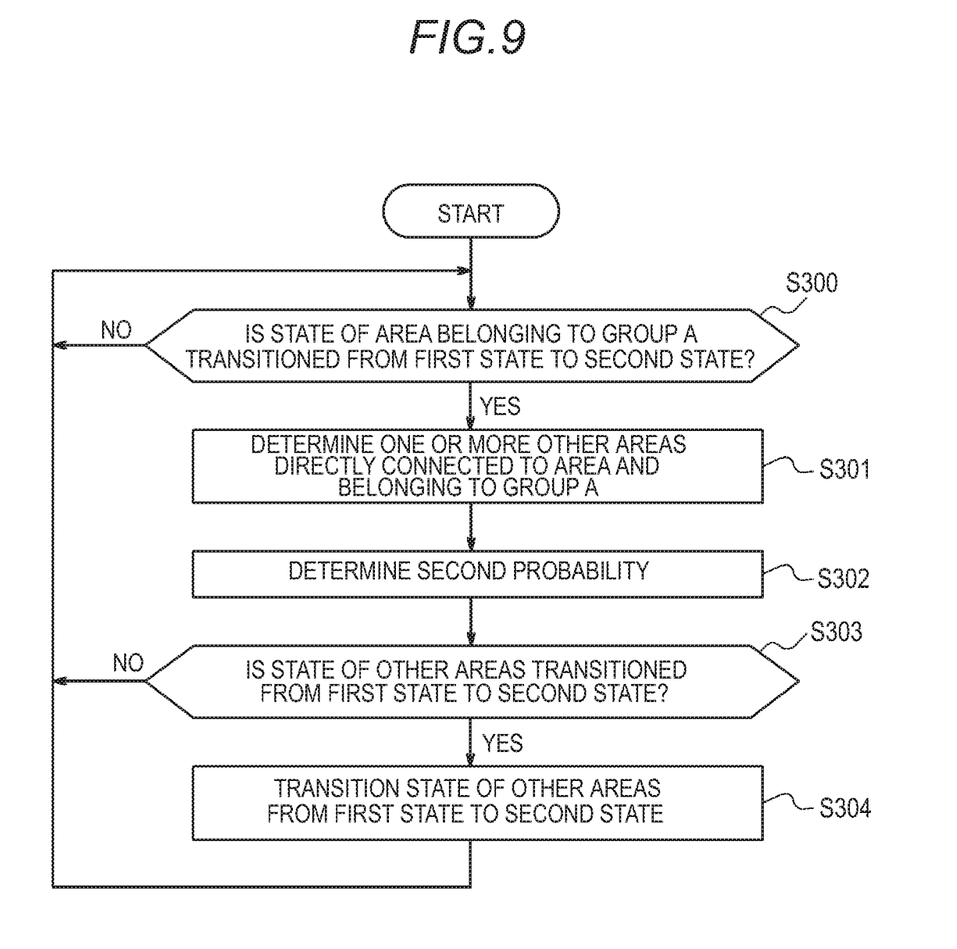
FIG. 9 is a flowchart illustrating an exemplary embodiment of a third operation of the terminal apparatus.

A third operation example of the terminal apparatus 20 may be described with reference to FIG. 9. The third operation example may include the operation of the terminal apparatus 20 that may perform the second transition process described above.

In step S300, the terminal control unit 25 may determine whether or not the state of the area belonging to a certain group (for example, a group A) has been transitioned from the first state to the second state. In a case where it is determined that the state of the area has been transitioned from the first state to the second state (Yes in step S300), the process may proceed to step S301. On the other hand, in a case where it is determined that the state of the area has not been transitioned from the first state to the second state (No in step S300), the process may repeat step S300.

In step S301, the terminal control unit 25 may determine one or more other areas directly connected to the area and belonging to the group A.

In step S302, the terminal control unit 25 may determine the second probability on the basis of, for example, information on the one or more other areas determined in step S301.

In step S303, on the basis of the second probability determined in step S302, the terminal control unit 25 may determine whether or not to transition the state of the one or more other areas from the first state to the second state. In a case where it is determined to transition the state of the one or more other areas from the first state to the second state (Yes in step S303), the process may proceed to step S304. On the other hand, in a case where it is determined not to transition the state of the one or more other areas from the first state to the second state (No in step S303), the process returns to step S300.

In step S304, the terminal control unit 25 may transition the state of the one or more other areas from the first state to the second state. Then, the process returns to step S300.

As described above, the terminal apparatus 20 according to this embodiment may start the game part in which the plurality of game content divided into two or more groups participate. In a case where another area not belonging to the first group does not exist on the route from the area belonging to the first group to the specific area belonging to the first group among the plurality of areas existing in the virtual space, the terminal apparatus 20 may perform the changing process of changing the first parameter of the first game medium located on the area and belonging to the first group. According to such a configuration, the changing process may be performed on the basis of the route from an area where the game medium may be located to a specific area. For this reason, in order to change the first parameter of the game medium, the player needs a strategy in consideration of the route. Therefore, the level of strategy of the game in which the plurality of game content divided into two or more groups participate may be improved. In addition, in the changing process, in a case where another area belonging to the first group and having the second state different from the first state exists on the route, the terminal apparatus 20 may reduce the changing amount of the first parameter of the first game medium or may set the changing amount to zero. According to such a configuration, in order to greatly change the first parameter of the game medium, the strategy for preventing the area on the route from having the second state may be required. Therefore, the strategy of the game in which the plurality of game content divided into two or more groups participate may be further improved.

Although the invention has been described with reference to drawings and embodiments, it should be noted that those skilled in the art can easily make various modifications and alterations on the basis of the present disclosure. Therefore, it should be noted that these modifications and alterations fall within the scope of the invention. For example, functions and the like included in each means, each step, and the like can be rearranged so as not to be logically contradictory, and a plurality of means, steps, and the like can be combined into one or divided.

For example, in the above-described embodiment, a configuration may be adopted where the terminal apparatus 20 executes a portion or all of the operations and processes executed by the server apparatus 10. Similarly, the server apparatus 10 may execute a portion of the operations executed by the terminal apparatus 20. For example, the processes such as display control of various screens displayed on the terminal apparatus 20 and control of various GUIs may be executed by either the server apparatus 10 or the terminal apparatus 20, or the processes may be executed cooperatively by the server apparatus 10 and the terminal apparatus 20. Alternatively, the game system 1 may not include the server apparatus 10. In such a case, the terminal apparatus 20 may store the information received from the server apparatus 10 in the above-described embodiment in advance.

In addition, in the above-described embodiment, examples of the first operation to the third operation executed by the terminal apparatus 20 have been described. However, some steps included in the first operation to the third operation, or some operations included in one step may be omitted.

In addition, in the above-described embodiment, a configuration has been described where the second transition process may be performed when the state of the area is transitioned from the first state to the second state. However, the execution timing of the second transition process may be not limited to the above-described example. The terminal control unit 25 may perform the second transition process, for example, every time an action opportunity is given to the game medium. For example, in a case where the game part may proceed based on a turn system, the terminal control unit 25 may perform the second transition process every time the turn of the game medium or the group to which the game medium may belong may start. In addition, for example, in a case where the game part may proceed in a real time system, the terminal control unit 25 may perform the second transition process each time a predetermined in-game time or a predetermined number of frames elapse. The terminal control unit 25 may change the frequency of execution of the second transition process on the basis of the second parameter of the area having the second state. For example, the smaller the second parameter of the area is, the lower the frequency of execution of the second transition process may be.

In addition, in the above-described embodiment, the configuration has been described where, in a case where it may be determined that another area not belonging to the group exists on the route from the area where the game medium to which the action opportunity may be given is located to the specific area belonging to the same group as the game medium, the changing process may be ended. However, in a case where it is determined that another area not belonging to the group exists on the route, instead of the configuration where the changing process is ended, the configuration may be available where the reference amount for changing the first parameter of the game medium may be reduced or set to zero.

In addition, in the above-described embodiment, a web display where at least a portion of the screen displayed on the terminal apparatus 20 may be displayed on the terminal apparatus 20 on the basis of the data generated by the server apparatus 10 may be used, and a native display where at least a portion of the screen may be displayed by a native application installed in the terminal apparatus 20 may be used. In this manner, the game according to the above-described embodiment can be a hybrid game in which each of the server apparatus 10 and the terminal apparatus 20 may be a portion of the process.

In addition, an information processing device such as a computer or a cellular phone can be preferably used in order to be allowed to function as the server apparatus 10 or the terminal apparatus 20 according to the above-described embodiment. Such an information processing device can be realized by storing, in a storage unit of the information processing device, a program describing process contents for realizing each function of the server apparatus 10 or the terminal apparatus 20 according to the embodiment and allowing the CPU of the information processing device to read and execute the program.

REFERENCE NUMBERS 1 game system
10 server apparatus 11 server communication unit
12 server storage unit
13 server control unit
20 terminal apparatus
21 terminal communication unit
22 terminal storage unit
23 display unit
24 input unit
25 terminal control unit
30 network
40 moving object
41 road surface
42 item
43 first game medium image
44 battle counterparty image
45 first parameter display area
46 second parameter display area
47 third parameter display area
48 soundness display area of battle counterparty
49 GUI area
50 icon
51 action point image
52 state display area

What is claimed is:

1. A non-transitory computer-readable medium embodying program code that, when executed, causes an information processing device executing a game to execute:
   starting a game part in which two or more groups participate, each of the two or more groups comprising one or more instances of game content; and
   determining if, on a route from a first area belonging to a first group to a specific area belonging to the first group, an area not belonging to the first group exists, and, when no area that does not belong to the first group exists on the route, performing a changing process of changing a first parameter of a first game medium by a changing amount, the first game medium being located on the first area and belonging to the first group,
   wherein the changing process further comprises determining if a second area belonging to the first group and having a second state exists on the route, wherein the second state is different from a first state, and, when the second area having the second state exists on the route, the changing amount of the first parameter of the first game medium is reduced or set to zero.

2. The non-transitory computer-readable medium according to claim 1, further causing the information processing device to execute, when an event related to the first area belonging to the first group and a second game medium belonging to a second group different from the first group occurs and a state of the first area is in the first state, performing a first transition process of transitioning the state of the first area from the first state to the second state with a first probability.

3. The non-transitory computer-readable medium according to claim 2, wherein the first probability is determined based on information on the first area belonging to the first group.

4. The non-transitory computer-readable medium according to claim 3, wherein the information on the first area belonging to the first group includes at least one of type and state of the first area, a number of instances of first game content of the first group located in the first area, and a positional relationship between the first area and the specific area belonging to the first group.

5. The non-transitory computer-readable medium according to claim 1, further causing the information processing device to execute setting a second parameter to the first area when a state of the first area is transitioned from the first state to the second state,
   wherein, in the changing process, in a case where the second area belonging to the first group and having the second state exists on the route, the changing amount of the first parameter of the first game medium is reduced or set to zero based on the second parameter of the second area.

6. The non-transitory computer-readable medium according to claim 1, further causing the information processing device to execute, when a state of the first area belonging to the first group is transitioned from the first state to the second state, performing a second transition process of transitioning a state of the second area belonging to the first group from the first state to the second state based on a second probability.

7. The non-transitory computer-readable medium according to claim 6, wherein the second probability is determined based on information on the second area directly connected to the first area and belonging to the first group.

8. The non-transitory computer-readable medium according to claim 6, further causing the information processing device to execute, when the state of the first area belonging to the first group is transitioned from the first state to the second state, among a plurality of the second areas directly connected to the first area and belonging to the first group, determining one or more second areas which transition in state based on the second probability in the second transition process based on information on the first area.

9. An information processing device configured to execute a game, comprising a control unit comprising one or more processors, which is configured to execute the following steps:
   starting a game part of the game in which two or more groups participate, each of the two or more groups comprising one or more instances of game content; and
   determining if, on a route from a first area belonging to a first group to a specific area belonging to the first group, an area not belonging to the first group exists, and, when no area that does not belong to the first group exists on the route, performing a changing process of changing a first parameter of a first game medium by a changing amount, the first game medium being located on the first area and belonging to the first group,
   wherein the changing process further comprises determining if a second area belonging to the first group and having a second state exists on the route, wherein the second state is different from a first state, and, when the second area having the second state exists on the route, the changing amount of the first parameter of the first game medium is reduced or set to zero.

10. A method of controlling an information processing device executing a game, comprising:
   starting a game part of the game in which two or more groups participate, each of the two or more groups comprising one or more instances of game content; and
   determining if, on a route from a first area belonging to a first group to a specific area belonging to the first group, an area not belonging to the first group exists, and, when no area that does not belong to the first group exists on the route, performing a changing process of changing a first parameter of a first game medium by a changing amount, the first game medium being located on the first area and belonging to the first group,
   wherein the changing process further comprises determining if a second area belonging to the first group and having a second state exists on the route, wherein the second state is different from a first state, and, when the second area having the second state exists on the route, the changing amount of the first parameter of the first game medium is reduced or set to zero.

\* \* \* \* \*